(12) United States Patent
Shingu et al.

(10) Patent No.: US 11,001,911 B2
(45) Date of Patent: May 11, 2021

(54) ALUMINUM ALLOY FOIL, LAMINATE OF SAME, METHOD FOR PRODUCING SAID ALUMINUM ALLOY FOIL, AND METHOD FOR PRODUCING SAID LAMINATE

(71) Applicant: TOYO ALUMINIUM KABUSHIKI KAISHA, Osaka (JP)

(72) Inventors: Akira Shingu, Osaka (JP); Mitsunari Ooyagi, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/466,804

(22) PCT Filed: Dec. 25, 2017

(86) PCT No.: PCT/JP2017/046358
§ 371 (c)(1),
(2) Date: Jun. 5, 2019

(87) PCT Pub. No.: WO2018/123933
PCT Pub. Date: Jul. 5, 2018

(65) Prior Publication Data
US 2020/0080171 A1    Mar. 12, 2020

(30) Foreign Application Priority Data

Dec. 27, 2016 (JP) .............................. JP2016-252884

(51) Int. Cl.
| | |
|---|---|
| C22C 21/00 | (2006.01) |
| B21B 1/02 | (2006.01) |
| B32B 15/08 | (2006.01) |
| B32B 15/20 | (2006.01) |
| B32B 37/18 | (2006.01) |
| C22F 1/04 | (2006.01) |
| B21B 3/00 | (2006.01) |

(52) U.S. Cl.
CPC .............. *C22C 21/00* (2013.01); *B21B 1/026* (2013.01); *B32B 15/08* (2013.01); *B32B 15/20* (2013.01); *B32B 37/182* (2013.01); *C22F 1/04* (2013.01); *B21B 2003/001* (2013.01)

(58) Field of Classification Search
None
See application file for complete search history.

(56) References Cited

U.S. PATENT DOCUMENTS

| | | | | |
|---|---|---|---|---|
| 4,334,935 | A | * | 6/1982 | Morris ..................... C22F 1/04 148/437 |
| 6,623,797 | B2 | * | 9/2003 | Avalos .................. B05C 5/0254 427/209 |
| 2018/0281036 | A1 | | 10/2018 | Shingu et al. |

FOREIGN PATENT DOCUMENTS

| | | |
|---|---|---|
| CN | 1884598 A | 12/2006 |
| JP | 2008-78277 A | 4/2008 |
| JP | 5116403 B2 | 1/2013 |
| WO | 2016/125608 A1 | 8/2016 |

OTHER PUBLICATIONS

International Search Report dated Mar. 27, 2018, issued in counterpart International Application No. PCT/JP2017/046358 (1 page).
Office Action dated Dec. 3, 2020, issued in counterpart Chinese Patent Application No. 201780080814.2 (14 pages; w/ English machine translation).

* cited by examiner

*Primary Examiner* — Daniel J. Schleis
(74) *Attorney, Agent, or Firm* — Westerman, Hattori, Daniels & Adrian, LLP

(57) ABSTRACT

Provided is an aluminum alloy foil that has sufficient surface hardness, while exhibiting excellent moist-heat resistance and corrosion resistance. The aluminum alloy foil contains 96.9 mass % or more aluminum, 0.4 mass % or more and 3 mass % or less of manganese, 0.03 mass % or more and 0.08 mass % or less of iron, 0.00001 mass % or more and 0.1 mass % or less of silicon, 0.00001 mass % or more and 0.03 mass % or less of copper, 0.00001 mass % or more and 0.01 mass % or less of zinc, and 0.00001 mass % or more and 0.001 mass % or less of magnesium, based on the aluminum alloy foil taken as 100 mass %.

9 Claims, No Drawings

ALUMINUM ALLOY FOIL, LAMINATE OF SAME, METHOD FOR PRODUCING SAID ALUMINUM ALLOY FOIL, AND METHOD FOR PRODUCING SAID LAMINATE

TECHNICAL FIELD

The present invention relates to an aluminum alloy foil, a laminate containing the aluminum alloy foil, a method for producing the aluminum alloy foil, and a method for producing the laminate.

BACKGROUND ART

Recent awareness of the need for reducing environmental burdens calls for further reducing the weight of means of transportation, such as aircraft, railroad cars, and automobiles. From the standpoint of user-friendliness, lighter component materials are also in demand in a wide range of fields, such as various machine components, electric and electronic components, building materials, and component materials for household use.

Against this backdrop, attempts have been made to reduce the weight of these component materials by replacing steel material or copper, which has a relatively high density, with aluminum and/or aluminum alloy, which has a lower density, when metal materials are used in these component materials.

However, aluminum alloy is typically prone to corrosion due to the influence of water, moisture, or salt water, for example. Thus, aluminum alloy is difficult to use in an environment where salt water may have an effect, such as outdoors (in particular, on the ocean and at seacoasts) and for packaging materials for salt-containing chemicals or salt-containing foods.

PTL 1 suggests an aluminum alloy containing a predetermined amount of manganese with a relatively lowered content of elements other than manganese. The presence of the predetermined amount of manganese enables the aluminum alloy to exhibit increased strength without decreasing its corrosion resistance, and the aluminum alloy can also be provided with sufficient stretching properties for achieving excellent moldability and high rollability for obtaining a thin foil by using a predetermined processing method.

However, when an aluminum alloy foil prepared from the aluminum alloy disclosed in PTL 1 is used, for example, under much more severe, hot and humid conditions, such as in power generation facilities or automotive parts, the aluminum alloy foil cannot exhibit sufficient performance in corrosion resistance under hot and humid conditions ("moist-heat resistance") and corrosion resistance, in particular, moist-heat resistance. Additionally, when used in a packaging material for chemicals or foods, such an aluminum alloy foil may not have a surface hardness sufficient to reduce or prevent scratches caused by it coming into contact with the content in the packaging material or other materials.

Electric and electronic components, for example, are also exposed to heat in the step of joining one component with another, or stacking one over another, more specifically in the step in which reflow soldering, heat press, heat molding, etc. are performed. When used in these components, such an aluminum alloy foil would decrease its strength due to heat. PTL 1 does not mention heat-resistant strength of aluminum alloy foil, which suppresses the decrease in strength caused by heat during the steps as described above and maintains sufficient strength as a component.

Accordingly, there has been demand for an aluminum alloy foil that has sufficient surface hardness and heat-resistant strength, while having moist-heat resistance and corrosion resistance in more severe environments, and for a laminate containing the aluminum alloy foil.

CITATION LIST

Patent Literature

PTL 1: Patent No. 5116403

SUMMARY OF INVENTION

Technical Problem

In view of the current status of the art, an object of the present invention is to provide an aluminum alloy foil that has excellent moist-heat resistance and corrosion resistance, and that also has sufficient surface hardness and heat-resistant strength.

Solution to Problem

The present inventors conducted extensive research to achieve the object, and found that an aluminum alloy foil containing a predetermined amount of iron together with a predetermined amount of manganese exhibits not only excellent corrosion resistance but also excellent moist-heat resistance, with sufficient surface hardness and heat-resistant strength. The inventors conducted further research based on these findings and completed the present invention.

Specifically, the present invention provides the following aluminum alloy foil and a laminate of the aluminum alloy foil.

Item 1.
An aluminum alloy foil comprising,
96.9 mass % or more of aluminum,
0.4 mass % or more and 3 mass % or less of manganese,
0.03 mass % or more and 0.08 mass % or less of iron,
0.00001 mass % or more and 0.1 mass % or less of silicon,
0.00001 mass % or more and 0.03 mass % or less of copper,
0.00001 mass % or more and 0.01 mass % or less of zinc, and
0.00001 mass % or more and 0.001 mass % or less of magnesium, based on the aluminum alloy foil taken as 100 mass %.

Item 2
The aluminum alloy foil according to Item 1, having a thickness of 5 μm or more and 300 μm or less.

Item 3
A laminate comprising
a resin film layer or a coating layer, or both layers, stacked on one surface or both surfaces of the aluminum alloy foil according to Item 1 or 2,
the laminate having a thickness of 6 μm or more and 301 μm or less.

Item 4
A method for producing an aluminum alloy foil, the method comprising rolling an ingot containing
96.9 mass % or more of aluminum,
0.4 mass % or more and 3 mass % or less of manganese,
0.03 mass % or more and 0.08 mass % or less of iron,
0.00001 mass % or more and 0.1 mass % or less of silicon,
0.00001 mass % or more and 0.03 mass % or less of copper, 0.00001 mass % or more and 0.01 mass % or less of zinc, and 0.00001 mass % or more and 0.001 mass % or less of magnesium.

Item 5

A method for producing a laminate, the method comprising stacking a resin film layer or a coating layer, or both layers, on one surface or both surfaces of the aluminum alloy foil obtained in Item 4.

Advantageous Effects of Invention

The aluminum alloy foil according to the present invention and a laminate thereof have excellent moist-heat resistance and corrosion resistance, and also have sufficient surface hardness and heat-resistant strength.

DESCRIPTION OF EMBODIMENTS

The aluminum alloy foil according to the present invention comprises 96.9 mass % or more of aluminum, 0.4 mass % or more and 3 mass % or less of manganese, 0.03 mass % or more and 0.08 mass % or less of iron, 0.00001 mass % or more and 0.1 mass % or less of silicon, 0.00001 mass % or more and 0.03 mass % or less of copper, 0.00001 mass % or more and 0.01 mass % or less of zinc, and 0.00001 mass % or more and 0.001 mass % or less of magnesium, based on the aluminum alloy foil taken as 100 mass %.

Aluminum

The aluminum alloy foil according to the present invention has an aluminum purity of 96.9 mass % or more as measured in accordance with the method described in JIS H 2102:2011.

Manganese

The aluminum alloy foil according to the present invention contains 0.4 mass % or more and 3 mass % or less of manganese based on the aluminum alloy foil taken as 100 mass %. Manganese is an element that increases the strength of an aluminum alloy without significantly decreasing its corrosion resistance. A manganese content of less than 0.4 mass % may result in not only failure to achieve sufficient moist-heat resistance and corrosion resistance, but also a decrease in surface hardness and heat-resistant strength. A manganese content of more than 3.0 mass % may lead to a decrease in rollability, thereby resulting in failure to obtain aluminum alloy foil, although such a content increases the hardness of the surface of the aluminum alloy. To obtain an aluminum alloy with corrosion resistance, moist-heat resistance, surface hardness, heat-resistant strength, and rollability, the content of manganese is preferably 0.4 mass % or more and 2.5 mass % or less, and more preferably 0.5 mass % or more and 1.5 mass % or less.

Iron

The aluminum alloy foil according to the present invention contains 0.03 mass % or more and 0.08 mass % or less of iron based on the aluminum alloy foil taken as 100 mass %. An aluminum alloy foil containing a predetermined amount of iron exhibits increased corrosion resistance in an atmosphere at a high temperature and a high humidity. An iron content of less than 0.03 mass % in aluminum alloy foil taken as 100 mass % may lead to insufficient corrosion resistance of the aluminum alloy foil in an atmosphere at a high temperature and a high humidity. An iron content of more than 0.08 mass %, on the other hand, may lead to a significant decrease in corrosion resistance in salt water at −40 to 60° C.

When aluminum alloy foil contains iron and manganese, aluminum-iron-manganese intermetallic compounds, such as $Al_6(Fe, Mn)$, are formed. An aluminum alloy containing such aluminum-iron-manganese intermetallic compounds formed in it typically exhibits excellent corrosion resistance to salt, compared with an aluminum alloy containing aluminum-iron-based intermetallic compounds formed in it. Additionally, a manganese content of 0.4 mass % or more and 3 mass % or less in the aluminum alloy foil is likely to help form aluminum-iron-manganese intermetallic compounds. However, an iron content of more than 0.08 mass % helps form aluminum-iron-based intermetallic compounds in addition to the aluminum-iron-manganese intermetallic compounds, possibly leading to a significant decline in corrosion resistance of the aluminum alloy foil against salt water at −40 to 60° C.

Additionally, a lower content of iron results in a lower surface hardness of the aluminum alloy foil. In view of the reasons described above, the iron content is more preferably 0.04 mass % or more and 0.07 mass % or less, and still more preferably 0.04 mass % or more and 0.06 mass % or less.

Silicon

The presence of silicon in an aluminum alloy may decrease the corrosion resistance of the aluminum alloy in an acidic environment, causing in particular pitting corrosion. However, the presence of silicon can also decrease or prevent the decline of corrosion resistance in an atmosphere at a high temperature and a high humidity. A lower content of silicon gives the aluminum alloy a smaller crystal grain size. This improves the stretching properties (i.e., rollability) of the aluminum alloy. Given these facts, the silicon content must be 0.00001 mass % or more and 0.1 mass % or less, and is more preferably 0.001 mass % or more and 0.08 mass % or less, based on the aluminum alloy foil taken as 100 mass %.

Copper

Even a trace amount of copper in an aluminum alloy decreases the corrosion resistance of the aluminum alloy. Thus, the copper content must be 0.03 mass % or less, based on the aluminum alloy foil taken as 100 mass %. The lower limit of the copper content is not particularly limited, and is typically about 0.00001 mass %. Achieving a copper content of less than 0.00001 mass % further requires, for example, repetition of fractional crystallization, thus greatly increasing the production cost. The copper content is preferably 0.02 mass % or less, and more preferably 0.01 mass % or less.

Zinc

Even a trace amount of zinc in an aluminum alloy decreases the corrosion resistance of the aluminum alloy. Thus, the zinc content must be 0.01 mass % or less, based on the aluminum alloy foil taken as 100 mass %. The lower limit of the zinc content is not particularly limited, and is typically about 0.00001 mass %. Achieving a zinc content of less than 0.00001 mass % requires, for example, repetition of the trinal electrolytic process, thus greatly increasing the production cost.

Magnesium

Magnesium is likely to condense in an oxide coating formed on the surface of aluminum, and thus causes coating defects, decreasing the corrosion resistance of the aluminum alloy. Thus, the magnesium content must be 0.001 mass % or less, based on the aluminum alloy foil taken as 100 mass %. The lower limit of the magnesium content is not particularly limited, and is typically about 0.00001 mass %. Achieving a magnesium content of less than 0.00001 mass % requires, for example, repetition of the trinal electrolytic process, thus greatly increasing the production cost.

Others

The aluminum alloy foil according to the present invention may contain, in addition to the metal elements described above, at least one element selected from the group consisting of transition elements, such as vanadium (V), titanium (Ti), zirconium (Zr), chromium (Cr), and nickel (Ni); and boron (B); gallium (Ga); bismuth (Bi); and the like. These elements each may be preferably present in an amount of 0.05 mass % or less, based on the aluminum alloy foil taken as 100 mass %.

In the present specification, the formula of the aluminum alloy foil is measured by inductively coupled plasma atomic emission spectroscopic analysis. The device for measurement includes the iCAP6500DUO produced by Thermo Fisher Scientific, Inc., and the ICPS-8100 produced by Shimadzu Corporation.

Thickness of Aluminum Alloy Foil

The aluminum alloy foil preferably has a thickness of 5 μm or more from the standpoint of strength and simplicity in production. The aluminum alloy foil also preferably has a thickness of 300 μm or less from the standpoint of reducing the weight of the aluminum alloy foil. The aluminum alloy foil more preferably has a thickness of 5 μm or more and 200 μm or less. The thickness of the aluminum alloy foil is made so as to fall within the numerical ranges above by performing casting and rolling in accordance with an ordinary method. Heat treatment may also be suitably performed.

Laminate

A laminate formed by stacking a resin film layer or a coating layer, or both layers, on at least one surface of the aluminum alloy foil according to the present invention is also a preferable embodiment. Such a laminate is suitable for use in circumstances in which corrosion resistance against salt water or moist-heat resistance under hot and humid conditions is required. Due to its high surface hardness, the laminate can also exhibit sufficient effects when used in packages for salt-containing drinks and food; packaging materials, such as for chemicals containing physiological saline; building materials, such as heat-insulating materials and waterproof sheets; and covering materials for shielding equipment that is installed on the ocean and at coastal areas (e.g., solar photovoltaic panels), machine components (e.g., those of marine vessels, aircraft, automobiles, and railroad cars), and electric and electronic components from electromagnetic waves (e.g., ultraviolet rays, visible light, infrared rays, and radio waves), gas, and moisture; and household and ornamental fields.

The number of the resin film layers, the number of coating layers, and the order of stacking the resin film layers and the coating layers in the aluminum alloy foil can be suitably determined depending on, for example, the intended use of the laminate, and are not limited. The laminate preferably has a thickness of 6 μm or more from the standpoint of strength, and preferably has a thickness of 301 μm or less from the standpoint of reducing the weight. The laminate more preferably has a thickness of 10 μm or more and 201 μm or less.

A resin film for use in the resin film layer can be selected from a wide range of films formed of a known resin, and the resin film is not particularly limited. Specifically, a resin film for use may be at least one member selected from polyethylene, polypropylene, polybutylene, polyethylene terephthalate, polyethylene naphthalate, polyvinyl chloride, polyvinylidene chloride, polyvinyl alcohol, copolymers of ethylene and vinyl acetate, polyamide, polyimide, and vinyl chloride. The thickness of the resin film layer can be suitably determined such that the laminate has a thickness that falls within the numerical ranges described above, taking into consideration the thickness of the aluminum alloy foil and the thickness of the coating layer described later.

A method for adhering a resin film layer onto an aluminum alloy foil when stacking the resin film layer on the aluminum alloy foil can be selected from a wide range of known methods, and the method is not particularly limited. Specifically, the method includes dry lamination, coextrusion, extrusion coating, extrusion lamination, and heat-sealing, all of which use a two-component curable adhesive (e.g., a polyester urethane-based two-component curable adhesive and a polyester-based two-component curable adhesive); and heat-lamination that uses an anchor coating agent.

A coating layer for use may be an inorganic coating, such as titanium oxide, silicon oxide, zirconium oxide, and chromium composition; and a resin coating, such as acrylic, polycarbonate, silicon resin, and fluorine resin. In addition, surface modification, for example, by plasma treatment, fatty acid, or a silane coupling agent, and a modified product formed by an acid and/or an alkali, can be suitably used, and the coating layer is not particularly limited. The thickness of the coating layer can also be suitably determined such that the laminate has a thickness that falls within the numerical ranges described above, taking into consideration the thickness of the aluminum alloy foil and the thickness of the resin film layer.

Method for Producing Aluminum Alloy Foil

The method for producing an aluminum alloy foil according to the present invention comprises rolling an ingot containing 96.9 mass % or more of aluminum, 0.4 mass % or more and 3 mass % or less of manganese, 0.03 mass % or more and 0.08 mass % or less of iron, 0.00001 mass % or more and 0.1 mass % or less of silicon, 0.00001 mass % or more and 0.03 mass % or less of copper, 0.00001 mass % or more and 0.01 mass % or less of zinc, and 0.00001 mass % or more and 0.001 mass % or less of magnesium.

The ingot can be obtained, for example, by melting aluminum metal, adding iron or aluminum-iron master alloy and manganese or aluminum-manganese master alloy thereto to obtain molten metal, and casting the molten metal by solidifying it. The casting method is not particularly limited, and can be selected from the group consisting of semi-continuous casting, continuing casting, mold casting, and the like.

The obtained ingot may be subjected to homogenizing annealing. Homogenizing annealing is preferably performed, for example, at a heating temperature of 400° C. or more and 630° C. or less for a heating time of 1 hour or more and 20 hours or less.

The rolling method can be selected from a wide range of known rolling methods, and is not particularly limited.

However, the rolling method preferably includes a cold rolling step after a hot rolling step, for ease of adjusting the thickness of the aluminum alloy foil. The number of hot rolling operations in the hot rolling step and the number of cold rolling operations in the cold rolling step can be suitably determined depending on the target final thickness.

When performing cold rolling multiple times, it is preferable to perform process annealing. In this case, it is preferable to perform the cold rolling step in the order of cold rolling one time or multiple times, process annealing, and cold rolling one time or multiple times. Process annealing is preferably performed at an annealing temperature of 50° C. or more and 500° C. or less for an annealing time of 1 second or more and 20 hours or less. This rolling framework makes it easy to adjust the thickness of the aluminum alloy foil.

After the hot rolling step and the cold rolling step, the method preferably further comprises a foil rolling step. Adding such a foil rolling step makes it easier to adjust the thickness of the aluminum alloy foil. The foil rolling step may be performed by multi-layer rolling.

After the foil rolling step, the method may further comprise a heat treatment step in which heat treatment is performed at a temperature of 50° C. or more and 450° C. or less for about 1 second to 50 hours. Adding this heat treatment step can remove the remaining rolling oil on the surface of the aluminum alloy foil to improve wettability, and adjust the mechanical characteristics of the aluminum alloy foil.

Method for Producing Laminate

It is also preferable to stack a resin film layer or a coating layer, or both layers, on one surface or both surfaces of the aluminum alloy foil obtained above to obtain a laminate. The method for stacking layers can be selected from a wide range of known methods. Specifically, the method for stacking layers for use is selected from the group consisting of dry lamination, extrusion lamination, wet lamination, heat lamination, and the like. When forming both the resin film layer and the coating layer on one surface or both surfaces of the aluminum alloy foil, it is preferable to stack the coating layer and the resin film layer in this order.

Although the above describes embodiments of the present invention, the present invention is not limited to these embodiments. It will be evident to those skilled in the art that various modifications can be made without departing from the spirit and principal concepts of the invention.

EXAMPLES

The following describes embodiments of the present invention in more detail with reference to Examples. However, the present invention is not limited to the Examples.

In accordance with the formulas shown in Table 1, aluminum alloys were melted and cast at a cooling rate of about $10^{2°}$ C./second, thereby obtaining aluminum alloy plates with a thickness of 6 mm. The obtained aluminum alloy plates were subjected to heat treatment at 400° C. for 5 hours. After being taken out from the furnace, the plates were rolled, thereby obtaining aluminum alloy foil with a thickness of 100 μm of Examples 1 to 7 and Comparative Examples 1 to 8.

Additionally, aluminum alloys were melted and cast at a cooling rate of about $10^{2°}$ C./second in accordance with the formulas shown in Table 1, thereby obtaining aluminum alloy plates with a thickness of 500 mm. The obtained aluminum alloy plates were subjected to homogenizing annealing at 610° C. for 10 hours. After being taken out from the furnace, the plates were subjected to hot rolling to obtain 7-mm-thick hot-rolled plates, and then subjected to cold rolling, thereby obtaining aluminum alloy foil of Examples 8 to 11 and Comparative Example 9, with each having a thickness as indicated in Table 1.

The information of the formula of aluminum alloy foil was obtained by weighing 1.00 g of aluminum alloy foil and measuring it by inductively coupled plasma atomic emission spectroscopy (instrument: ICPS-8100, Shimadzu Corporation).

Moist-Heat Resistance Evaluation Test

Test specimens prepared by cutting the aluminum alloy foil of each of the Examples and Comparative Examples (40 mm×40 mm) were allowed to stand in an atmosphere at a temperature of 120° C. under pressure at which the humidity reached 100% for 12 hours. The specimens were measured for mass before and after being allowed to stand, and the increase in mass due to oxidation corrosion on the surface was calculated. A test specimen with an increase in mass of less than 1.0% was evaluated as having sufficient moist-heat resistance. Since the test specimens of Examples 8 to 11 and Comparative Example 9 differed in mass, the increase in mass of these specimens was measured per 100 μm of thickness based on the following equation 1.

An increase in mass [%]=(the mass after a specimen was allowed to stand–the mass before the specimen was allowed to stand)/(the mass before the specimen was allowed to stand×100/ the thickness of the test specimen [μm])×100   Equation 1

Corrosion Resistance Evaluation Test

Test specimens prepared by cutting the aluminum alloy foil of each of the Examples and Comparative Examples (40 mm×40 mm) were immersed in an aqueous solution containing 3 mass % of sodium chloride and 3 mass % of acetic acid at 40° C. for 336 hours. The specimens were measured for mass before and after being immersed in the aqueous solution, and the decrease in mass due to dissolution corrosion was measured and calculated. A test specimen with a decrease in mass of less than 12.0% was evaluated as having sufficient corrosion resistance. Since the test specimens of Examples 8 to 11 and Comparative Example 9 differed in mass, the decrease in mass of these specimens was measured per 100 μm of thickness based on the following equation 2.

A decrease in mass [%]=(the mass before a specimen was immersed in an aqueous solution–the mass after the specimen was immersed in an aqueous solution)/(the mass before the specimen was immersed in an aqueous solution×100/ the thickness of the test specimen [μm])×100   Equation 2

Vickers Hardness Measurement Test

The aluminum alloy foil of each of the Examples and Comparative Examples was measured for Vickers hardness. A Vickers hardness measurement test was performed with surface scratch resistance being a benchmark, using a HMV-1 Vickers hardness tester produced by Shimadzu Corporation. Vickers hardness was measured after the specimen was pressed with a diamond indenter at a test load of 490 mN for 5 seconds. A test specimen with a Vickers hardness HV0.05 of 55.0 or more was evaluated as having sufficient surface hardness.

Heat Resistance Test

The obtained aluminum alloy foil of each of the Examples and Comparative Examples was heated at 250° C. for 3 hours and measured for tensile strength before and after the foil was heated. The tensile strength was a maximum tensile strength measured by performing a tensile test on aluminum alloy foil that was cut out in the size of 15 mm in the rolling-width direction and 200 mm in the rolling direction at a gauge length of 100 mm and at a tension rate of 20 mm/minute, using a VES5D autograph produced by Toyo Seiki Seisaku-Sho, Ltd. Foil with a tensile strength of 150 N/mm$^2$ or more after heating was evaluated as having sufficient heat resistance.

Test Results

As illustrated in Table 1, the aluminum alloy foil of each of the Examples was excellent in moist-heat resistance, corrosion resistance, surface hardness, and heat-resistant strength. In contrast, the aluminum alloy foil of each of the Comparative Examples was unsatisfactory in at least one of the moist-heat resistance, corrosion resistance, and surface hardness.

TABLE 1

| Examples | Formula (mass %) | | | | | | |
|---|---|---|---|---|---|---|---|
| | Al | Si | Fe | Cu | Mg | Zn | Mn |
| Example 1 | >99.3 | 0.02 | 0.048 | 0.0023 | 0.0002 | 0.0005 | 0.54 |
| Example 2 | >96.9 | 0.02 | 0.049 | 0.0023 | 0.0002 | 0.0006 | 2.98 |
| Example 3 | >98.8 | 0.01 | 0.036 | 0.0003 | 0.0002 | 0.0010 | 1.10 |
| Example 4 | >98.8 | 0.04 | 0.079 | 0.0035 | 0.0002 | 0.0009 | 0.96 |
| Example 5 | >98.8 | 0.10 | 0.079 | 0.0035 | 0.0002 | 0.0009 | 0.97 |
| Example 6 | >99.5 | 0.01 | 0.036 | 0.0003 | 0.0002 | 0.0010 | 0.40 |
| Example 7 | >98.5 | 0.05 | 0.053 | 0.0027 | 0.0002 | 0.008 | 1.21 |
| Example 8 | >98.5 | 0.05 | 0.053 | 0.0027 | 0.0002 | 0.008 | 1.21 |
| Example 9 | >98.5 | 0.05 | 0.053 | 0.0027 | 0.0002 | 0.008 | 1.21 |
| Example 10 | >98.5 | 0.05 | 0.053 | 0.0027 | 0.0002 | 0.008 | 1.21 |
| Example 11 | >98.5 | 0.05 | 0.053 | 0.0027 | 0.0002 | 0.008 | 1.21 |
| Comparative Example 1 | >99.9 | 0.00 | 0.000 | 0.0003 | 0.0002 | 0.0001 | 0.00 |
| Comparative Example 2 | >99.4 | 0.00 | 0.010 | 0.0008 | 0.0002 | 0.0006 | 0.51 |
| Comparative Example 3 | >98.9 | 0.01 | 0.019 | 0.0013 | 0.0002 | 0.0011 | 1.02 |
| Comparative Example 4 | >99.9 | 0.01 | 0.036 | 0.0003 | 0.0002 | 0.0010 | 0.00 |
| Comparative Example 5 | >99.8 | 0.04 | 0.090 | 0.0040 | 0.0002 | 0.0010 | 0.00 |
| Comparative Example 6 | >98.8 | 0.04 | 0.090 | 0.0040 | 0.0002 | 0.0010 | 1.00 |
| Comparative Example 7 | >98.4 | 0.07 | 0.543 | 0.0114 | 0.0002 | 0.0001 | 0.96 |
| Comparative Example 8 | >99.0 | 0.01 | 0.016 | 0.0003 | 0.0002 | 0.0005 | 0.22 |
| Comparative Example 9 | >99.3 | 0.07 | 0.543 | 0.0114 | 0.0002 | 0.0001 | 0.00 |

| Examples | Thickness (μm) | Moist-Heat Resistance Test Increase in Mass (%) | Corrosion Resistance Test Salt Water Decrease in Mass (%) | Vickers Hardness HV0.05 | Initial Tensile Strength N/mm$^2$ | Tensile Strength After Heating N/mm$^2$ |
|---|---|---|---|---|---|---|
| Example 1 | 100 | 0.6% | 10.1% | 59.6 | 186.7 | 158.3 |
| Example 2 | 100 | 0.4% | 11.9% | 99.2 | 295.6 | 251.4 |
| Example 3 | 100 | 0.8% | 8.9% | 68.5 | 211.1 | 186.9 |
| Example 4 | 100 | 0.4% | 11.9% | 60.9 | 214.7 | 182.5 |
| Example 5 | 100 | 0.6% | 11.0% | 66.1 | 229.2 | 201.8 |
| Example 6 | 100 | 0.7% | 9.2% | 55.4 | 181.2 | 150.7 |
| Example 7 | 100 | 0.5% | 11.9% | 74.2 | 236.4 | 196.5 |
| Example 8 | 12 | 0.6% | 9.2% | 54.8 | 226.0 | 155.3 |
| Example 9 | 20 | 0.4% | 9.3% | 64.3 | 225.0 | 157.1 |
| Example 10 | 75 | 0.3% | 9.5% | 64.4 | 203.6 | 154.8 |
| Example 11 | 250 | 0.4% | 11.2% | 63.4 | 197.6 | 153.3 |
| Comparative Example 1 | 100 | 2.2% | 4.0% | 19.9 | 51.7 | 11.9 |
| Comparative Example 2 | 100 | 1.5% | 8.2% | 57.5 | 178.9 | 150.8 |
| Comparative Example 3 | 100 | 1.0% | 9.4% | 66.7 | 203.6 | 179.4 |
| Comparative Example 4 | 100 | 1.1% | 8.4% | 45.0 | 147.7 | 100.8 |
| Comparative Example 5 | 100 | 0.5% | 15.0% | 49.0 | 169.0 | 118.6 |
| Comparative Example 6 | 100 | 0.4% | 12.5% | 68.5 | 221.8 | 196.2 |
| Comparative Example 7 | 100 | 0.5% | 13.2% | 77.5 | 255.5 | 194.4 |
| Comparative Example 8 | 100 | 2.1% | 6.8% | 49.2 | 163.6 | 121.7 |
| Comparative Example 9 | 12 | 0.4% | 12.0% | 43.4 | 178.8 | 64.6 |

(In the table, ">99.3%," for example, indicates that the content of aluminum (Al) is 99.3 mass % or more in aluminum alloy.)

The invention claimed is:

1. An aluminum alloy foil comprising,
   96.9 mass % or more of aluminum,
   0.4 mass % or more and 3 mass % or less of manganese,
   0.03 mass % or more and 0.08 mass % or less of iron,
   0.00001 mass % or more and 0.1 mass % or less of silicon,
   0.00001 mass % or more and 0.03 mass % or less of copper,
   0.00001 mass % or more and 0.01 mass % or less of zinc, and
   0.00001 mass % or more and 0.001 mass % or less of magnesium, based on the aluminum alloy foil taken as 100 mass %.

2. The aluminum alloy foil according to claim 1, having a thickness of 5 μm or more and 300 μm or less.

3. The aluminum alloy foil according to claim 1, wherein a content of iron is from 0.04 mass % to 0.06 mass %, and the aluminum alloy foil has a Vickers hardness of at least 55.0.

4. The aluminum alloy foil according to claim 1, wherein a content of manganese is from 0.5 mass % to 1.5 mass %.

5. The aluminum alloy foil according to claim 1, wherein a content of silicon is from 0.001 mass % to 0.08 mass %.

6. A laminate comprising
   a resin film layer or a coating layer, or both layers, stacked on one surface or both surfaces of the aluminum alloy foil according to claim 1,
   the laminate having a thickness of 6 μm or more and 301 μm or less.

7. A laminate comprising
   a resin film layer or a coating layer, or both layers, stacked on one surface or both surfaces of the aluminum alloy foil according to claim 2,
   the laminate having a thickness of 6 μm or more and 301 μm or less.

8. A method for producing an aluminum alloy foil, the method comprising rolling an ingot containing
   96.9 mass % or more of aluminum, 0.4 mass % or more and 3 mass % or less of manganese,
0.03 mass % or more and 0.08 mass % or less of iron,
0.00001 mass % or more and 0.1 mass % or less of silicon,
0.00001 mass % or more and 0.03 mass % or less of copper,
0.00001 mass % or more and 0.01 mass % or less of zinc, and
0.00001 mass % or more and 0.001 mass % or less of magnesium.

9. A method for producing a laminate, the method comprising stacking a resin film layer or a coating layer, or both layers, on one surface or both surfaces of the aluminum alloy foil obtained in claim 8.

* * * * *